US012737966B2

(12) United States Patent
Florenzano et al.

(10) Patent No.: US 12,737,966 B2
(45) Date of Patent: Sep. 15, 2026

(54) EFFICIENT GAUSSIAN SPLAT CAPTURE AND STORAGE

(71) Applicant: Shopify Inc., Ottawa (CA)

(72) Inventors: Eric Andrew Florenzano, San Francisco, CA (US); Brennan Letkeman, Calgary (CA); Diego Macario Bello, Montreal (CA); Daniel Beauchamp, Ottawa (CA); Russ Maschmeyer, Berkeley, CA (US)

(73) Assignee: Shopify Inc., Ottawa (CA)

( * ) Notice: Subject to any disclaimer, the term of this patent is extended or adjusted under 35 U.S.C. 154(b) by 106 days.

(21) Appl. No.: 18/774,165

(22) Filed: Jul. 16, 2024

(65) Prior Publication Data

US 2026/0024272 A1 Jan. 22, 2026

(51) Int. Cl.

*G06T 15/20* (2011.01)
*G06V 10/12* (2022.01)
*G06V 10/774* (2022.01)
*G06V 20/64* (2022.01)

(52) U.S. Cl.

CPC .............. *G06T 15/20* (2013.01); *G06V 10/12* (2022.01); *G06V 10/774* (2022.01); *G06V 20/64* (2022.01)

(58) Field of Classification Search

CPC .. G06T 15/20; G06T 7/70; G06T 7/75; G06T 7/97; G06T 15/08; G06V 10/12
See application file for complete search history.

(56) References Cited

U.S. PATENT DOCUMENTS 12,406,430 B1 * 9/2025 Lesser ..................... G06T 7/579
2024/0355047 A1 * 10/2024 Supikov .................. G06T 17/00
2025/0104349 A1 * 3/2025 Bi ........................... G06T 15/20

OTHER PUBLICATIONS

ACM Trans. Graph., vol. 42, No. 4, Article, Aug. 2023, "3D Gaussian Splatting for Real-Time Radiance Field Rendering", Kerbl, et al.

* cited by examiner

*Primary Examiner* — Antonio A Caschera
(74) *Attorney, Agent, or Firm* — Rowand LLP

(57) ABSTRACT

A system and method for generating a three-dimensional (3D) model of an object. The method includes: determining that a first portion of an object has a lower priority; obtaining a plurality of images of the object; and training a three-dimensional model of the object using a training algorithm that processes the plurality of images as training data to generate and refine Gaussian splats defining the three-dimensional model. Obtaining the plurality of images includes obtaining images including views of the first portion of the object from a first concentration of viewpoints; and obtaining images including views of the another portion of the object from a second concentration of viewpoints, the first concentration being less than the second concentration.

20 Claims, 7 Drawing Sheets

200
210
212
214

Gaussian splat 210
Parameters 220
Position 222
Covariance matrix 224
Opacity 226
Data channels 228

Gaussian splat 210
Parameters 220
Position 222
Covariance matrix 224
Opacity 226
Data channels 228
Contribution measure 230

512A
512B
512C
512D
512E
512F
510
500
522A
522B
520

EFFICIENT GAUSSIAN SPLAT CAPTURE AND STORAGE

FIELD

The present disclosure is related to a system and method for generating a three-dimensional (3D) model of an object. In particular, the present disclosure is related to a system and method for optimizing memory usage and training speeds of Gaussian splat models.

BACKGROUND

Gaussian splatting is a technique used to generate 3D models (Gaussian splat models) and rasterize the 3D models to two-dimensional (2D) images. The 3D models generated by Gaussian splatting are stored as a collection of Gaussian splats. In some contexts, the terms Gaussian splats and Gaussian splat model may be used interchangeably as the Gaussian splat model is made of Gaussian splats. These Gaussian splats are rasterized to generate a 2D image for viewing by a user. The process of Gaussian splatting involves: 1) taking images or videos of a scene from different angles, 2) using structure from motion (SfM) techniques to fill in blank spaces to estimate a 3D point cloud that models what the scene would look like from all directions, 3) converting each point into overlapping Gaussian splats, 4) running a training process, 5) storing the Gaussian splats and the Gaussian splat model, and 6) rasterizing the Gaussian splat model for 2D viewing by a user.

Applications of Gaussian splatting include viewing an interactive 3D model of a commercial product on a 2D display. For example, the website of a merchant may provide a page that displays thumbnails of products that can be purchased through its website. Clicking on a thumbnail may lead a user to view a page dedicated to a particular product (for example, a painting). Gaussian splatting may be used to display, on the dedicated page, a 2D representation of the painting. The user may interact with the 2D representation (for example, using the arrow keys of a keyboard) to view the painting from different viewpoints. Specifically, a stored Gaussian splat model may be rasterized to generate a 2D view of the product according to input received from the user.

Gaussian splatting involves storing Gaussian splats, Gaussian splat models, and images or views of the objects or products being modelled. Further, Gaussian splats and Gaussian splat models can have large file sizes. Accordingly, improvements can be made with respect to efficient memory usage.

Improvements can also be made to increase the training speed of Gaussian splat models.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
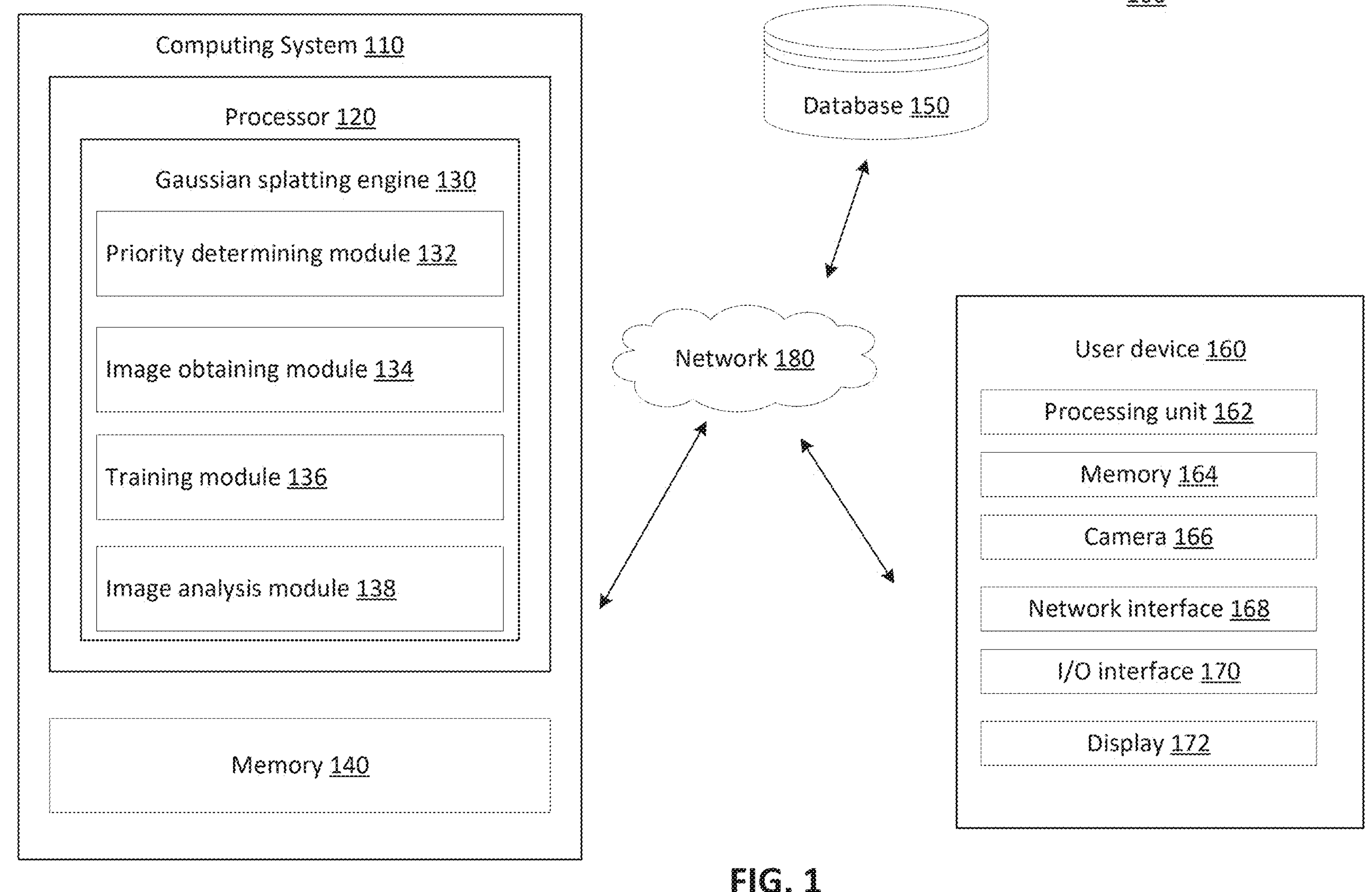
FIG. 1 is a block diagram illustrating an example networked computing environment for generating a Gaussian splat model for a product.

In an aspect, the present disclosure describes a computer-implemented method. The method includes: determining that a first portion of an object has a lower priority than another portion of the object; obtaining a plurality of images of the object; and training a three-dimensional model of the object using a training algorithm that processes the plurality of images as training data to generate and refine Gaussian splats defining the three-dimensional model. Obtaining the plurality of images includes: obtaining images including views of the first portion of the object from a first concentration of viewpoints; and obtaining images including views of the another portion of the object from a second concentration of viewpoints, the first concentration being less than the second concentration.

In some implementations, the lower priority of the first portion is determined based on user input.

In some implementations, the lower priority of the first portion is determined based on an object type associated with the object.

In some implementations, the lower priority of the first portion is determined based on stored viewing data for images of one or more objects of a same type as the object.

In some implementations, obtaining the plurality of images of the object includes: receiving an initial plurality of images of the object from an image capturing device; and generating a subset of the initial plurality of images, the subset including fewer images of the object that include views of the first portion than the initial plurality of images.

In some implementations, the plurality of images of the object are from a series of different viewpoints.

In some implementations, obtaining the plurality of images of the object includes receiving the plurality of images from an image capturing device.

In some implementations, the image capturing device determines that a current view predominantly includes the first portion and, responsive thereto, lowers a frequency at which the image capturing device captures images while in motion around the object.

In some implementations, the image capturing device determines that a current view predominantly includes the first portion and, responsive thereto, displays instructions on a display screen to increase movement speed of the image capturing device.

In some implementations, one of the plurality of images may be divided into an image predominantly including the first portion and an image not predominantly including the first portion.

In some implementations, the training includes: determining that one of the Gaussian splats is associated with the first portion of the object and, in response, reducing an amount of data stored in data channels associated with the one of the Gaussian splats.

In some implementations, the training includes: determining that one of the Gaussian splats represents a low-data portion of the object and, in response, reducing an amount of data stored in data channels associated with the one of the Gaussian splats.

In some implementations, the training algorithm uses a dynamic loss that is greater for images from the plurality of images that include views of the first portion relative to images from the plurality of images that include views of the another portion.

In some implementations, the training algorithm uses a dynamic learning rate that is greater for images from the plurality of images that include views of the first portion relative to images from the plurality of images that include views of the another portion.

In another aspect, the present application discloses a computing system. The computing system includes a processor and a memory coupled to the processor, the memory storing computer-executable instructions that, when executed by the processor, are to cause the processor to: determine that a first portion of an object has a lower priority than another portion of the object; obtain a plurality of images of the object; and train a three-dimensional model of the object using a training algorithm that processes the plurality of images as training data to generate and refine Gaussian splats defining the three-dimensional model. Obtaining the plurality of images includes obtaining images including views of the first portion of the object from a first concentration of viewpoints; and obtaining images including views of the another portion of the object from a second concentration of viewpoints, the first concentration being less than the second concentration.

In some implementations, obtaining the plurality of images of the object includes: receiving an initial plurality of images of the object from an image capturing device; and generating a subset of the initial plurality of images, the subset including fewer images of the object that include views of the first portion than the initial plurality of images.

In some implementations, the plurality of images of the object are from a series of different viewpoints.

In some implementations, obtaining the plurality of images of the object includes receiving the plurality of images from an image capturing device.

In some implementations, the image capturing device determines that a current view predominantly includes the first portion and, responsive thereto, lowers a frequency at which the image capturing device captures images while in motion around the object.

In some implementations, the training algorithm uses a dynamic loss that is greater for images from the plurality of images that include views of the first portion relative to images from the plurality of images that include views of the another portion.

In another aspect, the present application discloses a non-transitory, computer-readable storage medium storing computer-executable instructions that, when executed by one or more processors, are to cause the one or more processors to: determine that a first portion of an object has a lower priority than another portion of the object; obtain a plurality of images of the object; and train a three-dimensional model of the object using a training algorithm that processes the plurality of images as training data to generate and refine Gaussian splats defining the three-dimensional model. Obtaining the plurality of images includes obtaining images including views of the first portion of the object from a first concentration of viewpoints; and obtaining images including views of the another portion of the object from a second concentration of viewpoints, the first concentration being less than the second concentration.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrases "at least one of . . . and . . . " is intended to cover any one or more of the listed elements, including any one of the listed elements alone, any sub-combination, or all of the elements, without necessarily excluding any additional elements, and without necessarily requiring all of the elements. Similarly, the phrase "at least one of . . . or . . . " is also intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

Reference is made to FIG. 1, which illustrates an example networked computing environment 100 for generating a Gaussian splat model of a product. As shown in FIG. 1, the networked computing environment 100 may include a computing system 110, a database 150, a user device 160, and a network 180 connecting the components of the computing environment 100.

Gaussian splatting may be executed on the computing system 110. Computing system 110 is depicted having at least one processor 120 and a memory 140. The processor 120 may be a central processing unit, a microprocessor, a signal processor, an application-specific integrated circuit (ASIC), a field-programmable gate array (FGPA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 140 may include a volatile or non-volatile memory (e.g., a flash memory, a random access memory (RAM), and/or a read-only memory (ROM)). The memory 140 may be considered a computer-readable storage medium storing computer-executable instructions or a memory storing computer-executable instructions. The memory 140 may store instructions for execution by the processor 120. The memory 140 may be considered coupled to the processor 120.

Although FIG. 1 shows a single instance of each component, there may be multiple instances of each component in the computing system 110. Further, although the computing system 110 is illustrated as a single block, the computing system 110 may be a single physical machine or device (e.g., implemented as a single computing device, such as a single workstation, single end user device, single server, etc.), or may comprise a plurality of physical machines or devices (e.g., implemented as a server cluster). For example, the computing system 110 may represent a group of servers or cloud computing platform providing a virtualized pool of computing resources (e.g., a virtual machine, a virtual server).

FIG. 1 further illustrates the user device 160 interacting with the computing system 110. The user device 160 may be any electronic device capable of displaying a user interface. Examples of suitable electronic devices include mobile devices (e.g., smartphones, tablets, laptops, etc.), among others. The user device may be associated with a merchant. Example components of the user device 160 are now described, which are not intended to be limiting. It should be understood that there may be different implementations of the user device 160.

The user device 160 includes at least one processing unit 162 such as a processor, microprocessor, an application-specific integrated circuit (ASIC), a field-programmable gate array (FGPA), a dedicated logic circuitry, a graphics processing unit (GPU), a central processing unit (CPU), a dedicated artificial intelligence processor unit, or combinations thereof.

The user device 160 includes at least one memory 164, which may include a volatile or non-volatile memory (e.g., a flash memory, a random access memory (RAM), and/or a read-only memory (ROM)). The memory 164 may store instructions for execution by the processing unit 162.

The user device 160 may include a camera 166. The camera 166 may be adapted to capture 2D images of a 3D object from various angles between the camera 166 and the given 3D object. Different perspectives or views of the 3D object may be obtained by moving the user device 160, and thereby the camera 166, relative to the 3D object, by moving the 3D object relative to the user device 160, or by moving both the user device 160 and the 3D object relative to one another.

In some embodiments, the user device 160 and the camera 166 may be separate. In such an embodiment, different perspective or views of a 3D object may be obtained by moving the camera 166 relative to the 3D object, by moving the 3D object relative to the camera 166, or by moving both the camera 166 and the 3D object relative to one another. In this embodiment, the camera may send copies of captured 2D images to the user device 160.

The user device 160 includes at least one network interface 168 for wired or wireless communication with an external system or network (e.g., an intranet, the Internet, a P2P network, a wide area network (WAN) and/or a local area network (LAN), and in particular, for communication with the computing system 110.

The user device 160 also includes at least one input/output (I/O) interface 170, which interfaces with input and output devices. In some examples, the same component may serve as both input and output device (e.g., a display 172 may be a touch-sensitive display). The user device 160 may include other input devices (e.g., buttons, microphone, touchscreen, keyboard, etc.) and other output devices (e.g., speaker, vibration unit, etc.).

The database 150 may be associated with an e-commerce platform. The database 150 may be maintained by the e-commerce platform. Data within the database 150 may store product data relating to items or products made available via an online storefront including without limitation, product merchants, product types, product viewing data, product text descriptions, product images, product thumbnails, product promotions, priorities with respect to the products, and Gaussian splat models of products. The product data may be stored in the database 150 in a hierarchical format. In some cases, the product data may be grouped by categories. Categories such as merchant, product class, subclasses, etc. The database 150 may be in communication with one or both of the computing system 110 and the user device 160.

While FIG. 1 shows that database 150 separately from the computing system 110. In some embodiments, the database 150 may be integrated with the computing system 110. In such an embodiment, the computing system 110 stores product data.

Returning to the computing system 110, the memory 140 of the computing system 110 may contain Gaussian splatting software, programming, or computer-executable instructions which when executed by the processor 120 generates a Gaussian splat model for an object. In the embodiment illustrated in FIG. 1, the processor 120 has a Gaussian splatting engine 130 to execute the Gaussian splatting software. The Gaussian splatting engine 130 may be in communication with the user device 160 and the memory 140. The Gaussian splatting engine 130 is shown including a priority determining module 132, an image obtaining module 134, a training module 136, and an image analysis module 138.

The priority determining module 132 allows the processor to determine or assign a priority or a priority value to a portion of an object or product to be modelled by Gaussian splatting. A priority or priority value may be "low" or "high." In the alternative, a priority or priority value may be a binary value such as 0 or 1. Additionally or alternatively, a priority or a priority value may be determined from a set of multiple values such as "very low," "low," "moderately low," "moderate," "moderately high," "high," and "very high." Additionally or alternatively, a priority may be determined from a spectrum of value such as the set of real numbers greater than or equal to 0 and less than or equal to 1. Additionally or alternatively, a priority may be determined from an unbounded set of values such as the set of integers. Additionally or alternatively, a priority may be determined from a set of values that are bounded on one end and unbounded on the other such as the set of positive integers. A priority determined from a set of values bounded on one end and unbounded on the other may be suitable for situations where there is a maximum priority but no minimum priority.

The priority determining module 132 may allow the computing system 110 to communicate with the database 150 or the user device 160 for the purposes of determining a priority. For example, the priority determining module 132 may cause the processor 120 to refer to product data stored in the database 150 to determine priority. For example, if the object to be modelled was a painting, the priority determining module 132 may cause the computing system 110 to query the database 150 for product data relating to paintings. In response, the database 150 may return product data relating to paintings including viewing data of paintings. The viewing data may indicate that shoppers of paintings on an e-commerce platform frequently view the front of paintings, less frequently view the frames of paintings, and even less frequently view the backsides of paintings. Based on this viewing data, the priority determining module 132 may cause the processor 120 to determine that, for a painting-type object or product, the frame has a lower priority than the front and the backside has a lower priority than the frame. That is, priority may be determined based on stored viewing data for images of one or more objects of the same type.

Additionally or alternatively, in response to receiving, from the computing system 110, a query for data related to an object type, for example a painting, the database 150 may return product data for painting-type products indicating the priority determinations for other painting-type objects or products. For example, the database 150 may return data indicating that out of all painting-type products recorded in the database 150, the priority determinations are as seen in the table below.

| | Low priority | Moderate priority | High priority |
|---|---|---|---|
| Front | 1% | 2% | 97% |
| Frame | 33% | 38% | 29% |
| Backside | 90% | 8% | 2% |

Based on the example data above, the priority determining module 132 may cause the processor 120 to determine that, for a painting-type object, the front has a high priority, the frame has a moderate priority, and the backside has a moderately low priority. In other words, the processor 120 may determine that the frame has a lower priority than the front and that the backside has an even lower priority than the frame. More generally, priority may be determined based on an object type associated with the object.

Additionally or alternatively, the priority determining module 132 may allow the processor 120 to use artificial intelligence such as generative artificial intelligence to determine priorities. For example, in response to obtaining a text description of an object, object type associated with the object, or image data of the object, the processor 120 may use artificial intelligence to determine priorities of portions of the object. In a nonlimiting example, in response to obtaining the text description "beautiful painting of a mountain with a fancy frame" for an object, the processor 120 may use generative artificial intelligence to determine that the portion of the object corresponding to the backside of the painting has a lower priority than the portion of the object corresponding to the frame of the painting. The processor may also use generative artificial intelligence to rank the priority of a frame of a painting with the description "beautiful painting of a mountain with a fancy frame" higher than a frame of a painting with the description "beautiful painting of a mountain with a wooden frame."

Additionally or alternatively, the priority determining module 132 may allow the processor 120 to determine priorities of the portions of an object based on user input. For example, a representative person of a merchant of a painting may use the user device 160 to send to the computing system 110, via the network interface 168, that the portion of the painting corresponding to the frame has a lower priority than the portion corresponding to the front. For example, the representative person may, on an image of the painting, draw volumes around portions of the painting that have a lower priority via a touchscreen to indicate priorities of the portions of the painting. Additionally or alternatively, computer vision-based segmentation may also be used to assist the representative person in indicating the priorities of the portions of the painting.

In FIG. 1, the Gaussian splatting engine 130 is also shown to include the image obtaining module 134. The image obtaining module 134 allows the processor 120 to obtain ground truth images of the object to be modelled by Gaussian splatting. The obtained images are then used to train the Gaussian splat model for the object. For example, ground truth images of a painting-type object may be stored in the database 150. The processor 120 may, based on the determined priorities of the portions of the painting, obtain a subset of the ground truth images for training the Gaussian splat model. In another embodiment, the ground truth images may be provided directly to the computing system 110 from the user device 160 and the processor 120 may then subsequently obtain a subset of the received images for training the Gaussian splat model. In another embodiment, the priority determining module 132 and the image obtaining module 134 may act together while the computing system 110 is in communication with the user device 160. For example, while a representative person of the merchant of the object, uses camera 166 to capture images of the object, the computing system 110 may send instructions to the user device 160 via the network 180, the instructions instructing to capture images of lower priority portions of the object at a concentration lower than higher priority portions of the object. In the painting-type object example, the instructions may result in the user device 160 capturing a collection of images of the object that has a low concentration of images of the frame relative to images of the front. The computing system 110, and thereby the processor 120, may obtain the images captured based on priority from the user device 160 via the network 180.

In cases where an image of the object depicts portions with varying priorities, the image obtaining module 134 may cause the processor 120 to separate, divide, or partition the image into multiples images, each new image corresponding to a portion of the object with a particular priority. For example, if the object is a painting, and the front and the frame can both be viewed in an image of the object, the processor 120 may partition the image into a first image that predominantly shows the frame and a second image that predominantly shows the front. Techniques for separating, dividing, or partitioning images include without limitation masking techniques.

In FIG. 1, the Gaussian splatting engine 130 is also shown to include the training module 136. The training module 136 causes the processor 120 to train a Gaussian splat model for the object based on the obtained ground truth images. Training a Gaussian splat model involves using a gradient descent algorithm to adjust the parameters of the collection or set of Gaussian splats that form the Gaussian splat model.

The Gaussian splatting engine 130 is also shown to include the image analysis module 138. The image analysis module 138 causes the processor 120 to analyze ground truth images. For example, the processor 120 may analyze a ground truth image of the object and determine that the image, or a section of the image, corresponds to a low-data portion. A low-data portion may be a portion of the object, or surface, that requires relatively less data to model by Gaussian splatting such as a flat, matte, and/or plain surface. A matte wooden frame of a painting may be considered a low-data portion. The processor may use the determination that a portion of the object, or surface, is a low-data portion to reduce the data stored in a Gaussian splat model. In cases where an image of the object depicts portions that are a low-data portion and portions that are not a low-data portion, the processor 120 may separate, divide, or partition the image into multiples images, such that each new image predominantly depicts a portion that is low-data or predominantly depicts a portion that is not low-data. Techniques for separating, dividing, or partitioning images include without limitation masking techniques.

The image analysis module 138 may analyze ground truth images after or before being obtained by the processor 120 for training the Gaussian splat model.

Figures 2A, 2B, 2C:
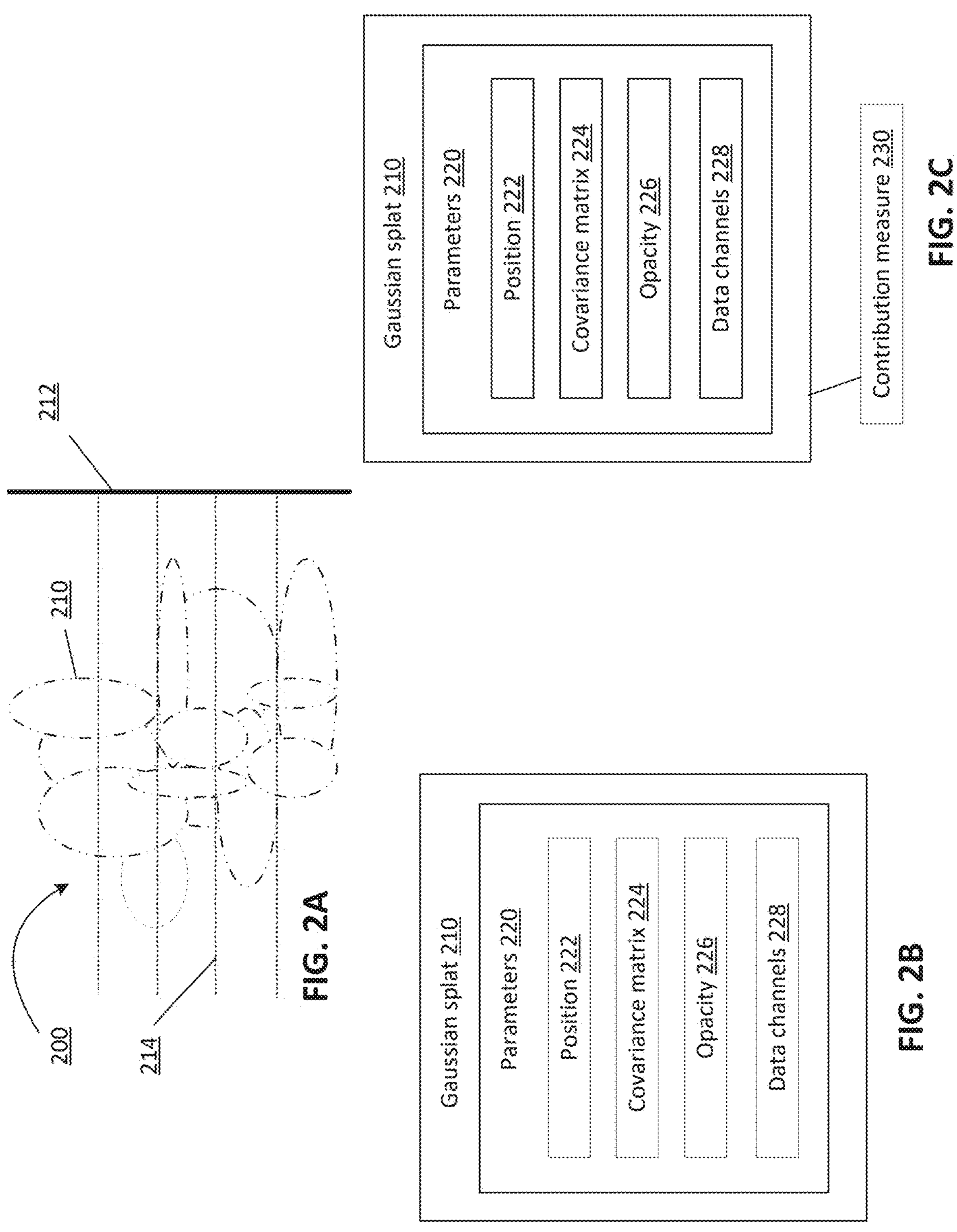
FIG. 2A is a simplified diagram representing an example Gaussian splat model and its projection to a 2D surface.
FIG. 2B is a block diagram representing a Gaussian splat.
FIG. 2C is a block diagram representing a Gaussian splat that is associated with a contribution measure.

FIG. 2A is a simplified diagram representing an example Gaussian splat model 200 and its projection, or rasterization, to a 2D surface 212. The Gaussian splat model 200 is comprised of a collection or set of overlapping Gaussian splats, one such Gaussian splat being a Gaussian splat 210.

FIG. 2B is a block diagram representing the Gaussian splat 210. The Gaussian splat 210 is defined by parameters 220, the parameters 220 being position 222, covariance matrix 224, opacity 226, and data channels 228. The position 222 corresponds to the position of the Gaussian splat 210 in the Gaussian splat model 200. The covariance matrix 224 is a 3 by 3 matrix that defines the shape of the Gaussian splat 210. The opacity 226 corresponds to the opacity of the Gaussian splat 210. The data channels 228 define the color of the Gaussian splat. In some example instances, the data channels 228 may have a relatively small amount of data defining the color of the Gaussian splat 210. Such instances may correspond to a situation where the Gaussian splat 210 projects or rasterizes to a low-data portion such as a flat matte surface. In other example instances, the data channels 228 may have a relatively large amount of data defining the color of the Gaussian splat 210. Such instances may correspond to a situation where the Gaussian splat 210 projects or rasterizes to a surface that is not low-data such as a shiny surface.

Returning to FIG. 2A, FIG. 2A also shows a thread 214 traversing from the 2D surface 212 and through the Gaussian splats of the Gaussian splat model 200. For generating a 2D image representing a view of the object being modelled by the Gaussian splat model 200, the processor 120 projects, or rasterizes, a 2D image from the Gaussian splat model 200 to a 2D surface such as the 2D surface 212. In order to rasterize the Gaussian splat model 200, for each pixel, the processor 120 determines the color of that pixel by accumulating color from Gaussian splats along a thread traversing from the part of the 2D surface 212 corresponding to the pixel, such as the thread 214, until the pixel is fully saturated.

FIG. 2C is a block diagram representing the Gaussian splat 210 in association with a contribution measure 230. The contribution measure 230 may be a variable that measures the contribution of the Gaussian splat 210 to a low priority, or lower priority, portion of the object. For example, if the object being modelled by Gaussian splatting was a painting and the Gaussian splat 210 primarily contributed to the image generation of the lower priority backside of the painting, the contribution measure 230 may indicate that Gaussian splat 210 is a Gaussian splat corresponding to a lower-priority portion of the painting. Alternatively, if Gaussian splat 210 primarily contributed to the image generation of the higher priority front of the painting, the contribution measure 230 may indicate that Gaussian splat 210 is a Gaussian splat corresponding to a higher-priority portion of the painting.

Additionally or alternatively, the contribution measure 230 may measure the contribution of the Gaussian splat 210 to a low-data portion of the object. For example, if the Gaussian splat 210 primarily contributed to the image generation of a low-data portion of the object, say a plain wooden matte frame of a painting, the contribution measure 230 may indicate that Gaussian splat 210 is a Gaussian splat corresponding to a low-data portion of the painting. Alternatively, if the Gaussian splat 210 primarily contributed to the image generation of a portion of the object that is not low-data, say a shiny ornate frame of a painting, the contribution measure 230 may indicate that Gaussian splat 210 is a Gaussian splat corresponding to a portion of the object that is not low-data.

While training the Gaussian splat model 200, the processor 120 may associate a contribution measure with any Gaussian splat to measure the contributions of that Gaussian splat when generating an image. For example, the contribution measure 230 is shown to be associated with Gaussian splat 210 in FIG. 2C. The processor 120 may reduce the amount of data stored for the data channels 228 depending on what is indicated by the contribution measure 230. For example, the processor may reduce the amount of data stored for the data channels 228 if Gaussian splat 210 corresponds to a low-data portion or a low-priority portion of the object being generated by Gaussian splatting. More generally, the processor 120 may determine that a Gaussian splat is associated with a lower-priority portion of the object and, in response, reduce an amount of data stored in data channels associated with the Gaussian splat. Additionally or alternatively, the processor 120 may determine that a Gaussian splat represents a low-data portion of the object and, in response, reducing an amount of data stored in data channels associated with the Gaussian splat.

Contribution measure 230 may be a variable that only exists during training of the Gaussian splat model 200. That is, contribution measure 230 may not be stored in memory, such as the memory 140, or a database, such as the database 150, after the training for the Gaussian splat model 200 is finished.

Using contribution measures such as contribution measure 230 allows for more efficient use of memory during storage of the Gaussian splat model 200 because reducing the amount of data stored in data channels of Gaussian splats such as the data channels 228 results in a smaller file size for the Gaussian splat model 200. Reducing the amount of data stored in data channels of Gaussian splats may also lead to increased training speed for the Gaussian splat model 200 because the reduced amount of stored data may result in less data, or inputs to parameters, that are adjusted during the execution of the gradient descent algorithm for training the Gaussian splat model 200.

Figure 3:
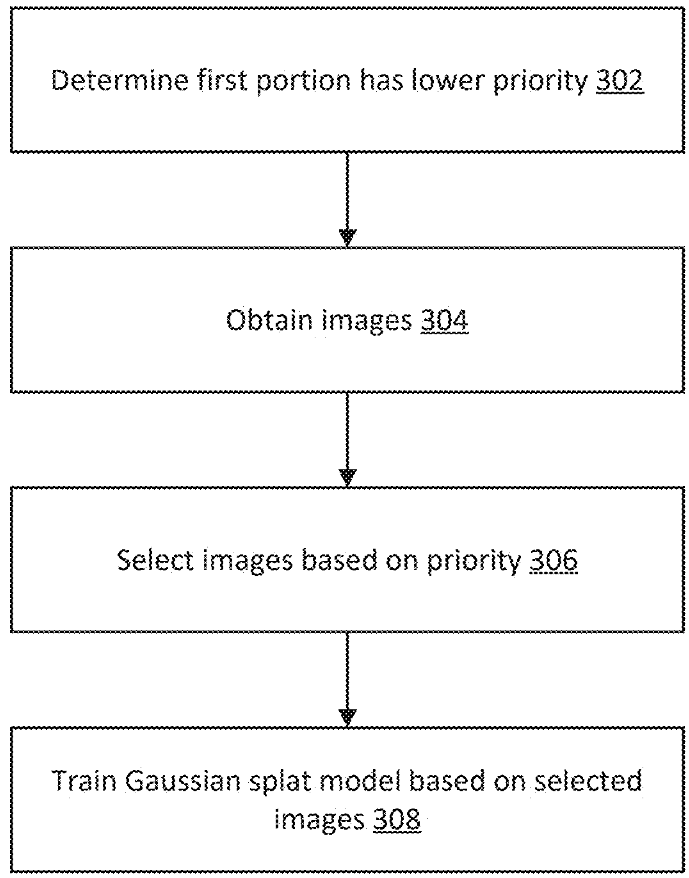
FIG. 3 shows in flowchart form, one simplified example method allowing for efficient memory use and increased training speed with respect to Gaussian splatting.

Reference is now made to FIG. 3 which shows in flowchart form, a method 300 allowing for efficient memory use and increased training speed with respect to Gaussian splatting. The method 300 may be performed by a computing system that supports Gaussian splatting, such as the computing system 110 shown in FIG. 1. In particular, the memory 140 may store computer-executable instructions for the processor 120 to execute the operations of the method 300 via the Gaussian splatting engine 130.

The method 300 beings with an operation 302. At operation 302, a processor, may determine that a first portion of an object to be modelled by Gaussian splatting has a lower priority than another portion of the object. For example, if a painting were to be modelled by Gaussian splatting, the processor 120 may determine that the backside of the painting has a lower priority.

At operation 302, a processor may determine that the first portion has a lower priority based on user input. For example, in the context of generating a Gaussian splat model for a painting sold by a merchant user, the merchant user may submit, from a user device such as the user device 160, data indicating that the backside of the painting has a lower priority. The merchant user may indicate that the backside of the painting has a lower priority by drawing, on an image of the painting, a volume around the backside of the painting. The merchant may draw the volume via a touchscreen. In another embodiment, a computing device such as the user device 160 may automatically draw a volume around or isolate the backside in an image of the painting in response to the merchant clicking, via a cursor or a mouse, on a part of the image corresponding to the backside. Additionally or alternatively, computer vision-based segmentation may also be used to assist the merchant user in indicating the lower priority of the backside. In another embodiment, the merchant user may send a textual message such as "the backside has lower priority than the front" to the computing system generating the Gaussian splat model such as computing system 110. The processor may determine the lower priority of the first portion, such as the backside, based on the received textual message.

In another embodiment, the processor may determine that the first portion has a lower priority based on an object type associated with the object to be modelled by Gaussian splatting. For example, if the object being modelled is a painting, the processor may obtain data pertaining to the priorities of portions of other paintings. Based on the data pertaining to other paintings, the processor may determine that the backside of the painting has a lower priority relative to the front of the painting.

In another embodiment, the processor may determine that the first portion has a lower priority based on a text description of the object to be modelled by Gaussian splatting. For example, in response to obtaining the text description "beautiful painting of a mountain with a cool backside" for an object, the processor may determine that the portion of the object corresponding to the frame of the painting has a lower priority than the portion of the object corresponding to the backside of the painting.

In another embodiment, the processor may determine that the first portion has a lower priority based on stored viewing data for images of one or more objects of the same type as the object. For example, when generating a Gaussian splat model for a painting, the processor may obtain data from memory or storage in the computing device, or alternatively an external database, indicating that on an associated e-commerce platform, shoppers of paintings frequently view fronts of paintings, less frequently view the frames of paintings, and even less frequently view the backsides of paintings. Based on such data, the processor may determine that the backside has a lower priority than other portions of the painting.

Additionally or alternatively, artificial intelligence such as generative artificial intelligence may be used for determining that the first portion of the object has a lower priority. For example, the processor may use artificial intelligence to determine the lower priority based on a text description. In another example, the processor may use artificial intelligence to isolate the first portion with a lower priority based on user input. In another example, the processor may use artificial intelligence to analyze stored viewing data. In another example, the processor may determine that the first portion has a lower priority based on artificial intelligence alone. For example, the processor may use artificial intelligence to analyze an image of a painting provided by a merchant user and determine that the backside of the painting has a lower priority than the front of the painting.

Referring back to FIG. 3, after operation 302, flow control proceeds to an operation 304. At operation 304, the processor obtains images, or an initial plurality of images, of the object to be modelled by Gaussian splatting. The processor, such as the processor 120, may obtain images of the object from an image capturing device, such as the user device 160. Additionally or alternatively, the processor may obtain images of the object from a storage, such as the database 150. The storage may be external or integrated with the computing device of the processor. In another embodiment, the processor may obtain images by capturing frames from video data. In this embodiment, the processor may obtain video data from a video capturing device, such as the user device 160, or a storage such as database 150.

After operation 304, flow control proceeds to an operation 306. At operation 306, the processor selects images, from the images obtained in operation 304, based on priority. The selection process may result in the processor obtaining a plurality of images of the object, wherein the plurality of images contains 1) images including views of the first portion of the object from a first concentration of viewpoints, and 2) images including view of the another portion of the object, determined to have a high priority that the first portion at operation 302, from a second concentration of viewpoints wherein the first concentration is less than the second concentration. In the example where the backside of the painting has a lower priority, the processor may obtain a plurality of images wherein images of the painting that include views of the backside are less densely distributed than images of the painting that do not include views of the backside.

It is noted that, in this particular context, "less dense" and "lesser concentration" do not mean that there are fewer images including views of the first portion in the plurality of images relative to images including views of another portion of the object. A finite number of images of an object or a portion of an object cannot cover all viewpoints of that object or portion of that object; consequently, there are missing viewpoints. "Less dense" and "lesser concentration" may be interpreted to mean that the ratio of missing viewpoints to covered viewpoints is greater. They may also be interpreted to mean that the ratio of covered viewpoints to missing viewpoints is lesser.

Additionally or alternatively, the processor may separate, divide, or partition an image if the image includes views of the first portion and another portion that has a different priority. The separation may result in multiple images, each new image depicting a view that is predominantly a particular priority. That is, one of the plurality of images may be divided into an image predominantly including the first portion and an image not predominantly including the first portion. In the example of a painting, the processor may separate an image showing the backside and the frame into one image showing the backside and another image showing the frame. Techniques that can be used to separate, divide, or partition include without limitation masking techniques.

Based on operations 304 and 306, in some embodiments, the processor receives an initial plurality of images of the object from an image capturing device and generates a subset of the initial plurality of images, the subset including fewer images of the object that include views of the first portion than the initial plurality of images.

At operation 308, the processor may train the Gaussian splat model based on the images selected in operation 306. The Gaussian splat model may be trained using a gradient descent algorithm. As the gradient descent algorithm is run, the Gaussian splats defining the Gaussian splat model may be refined by adjusting the parameters of the Gaussian splats. More generally, the processor may train a 3D model of the object using a training algorithm that processes the plurality of images as training data to generate and refine Gaussian splats defining the three-dimensional model.

Advantages provided by the method 300 include the lower number of images used to train the Gaussian splat model. The lower number of images results in a more efficient use of memory because less memory is used to store the images during the generation and training of the Gaussian splat model. The lower number of images also results in a quicker training speed for the Gaussian splat model because fewer images are used to calculate loss during the gradient descent algorithm.

Figure 4:
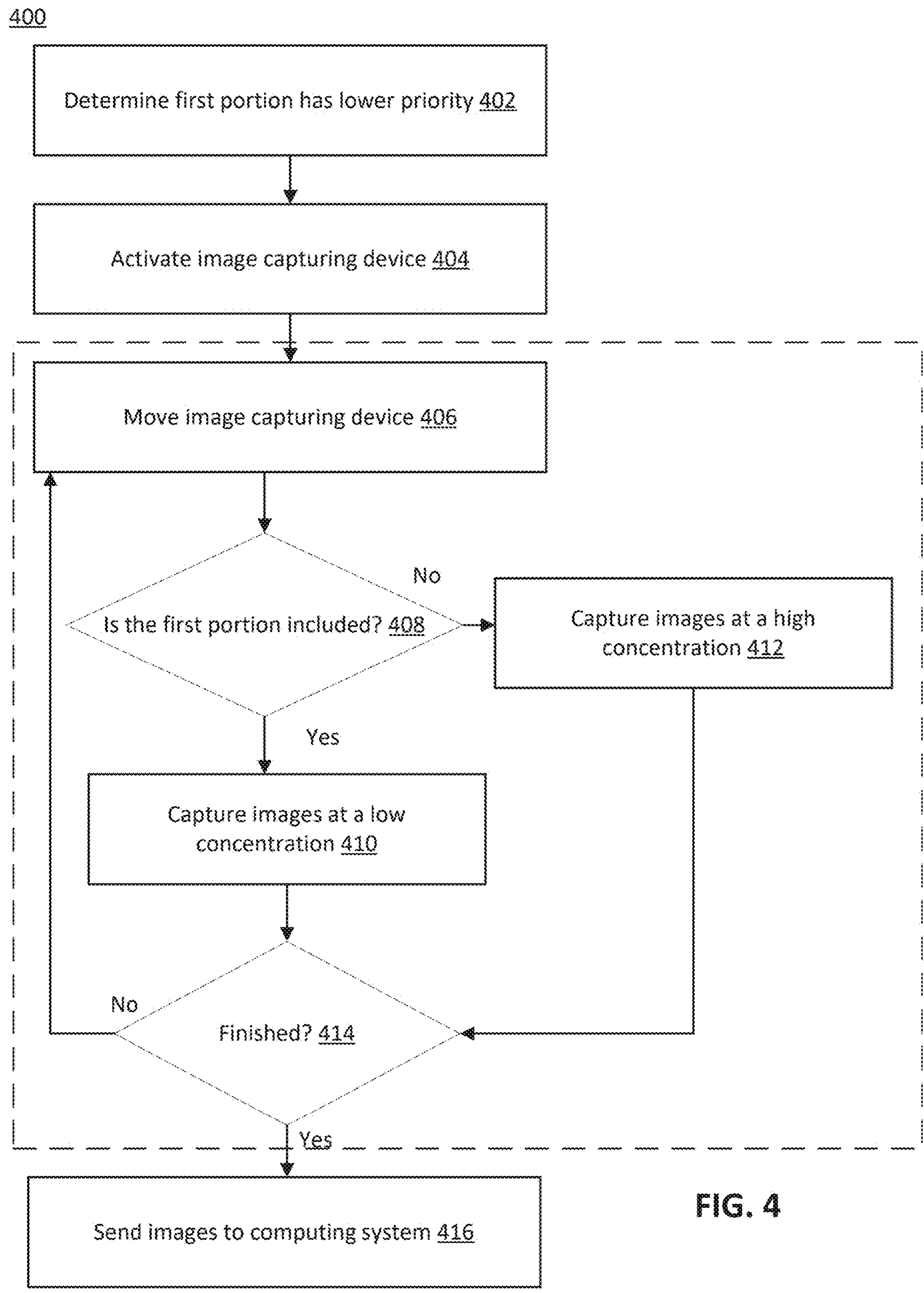
FIG. 4 shows in flowchart form, another simplified example method allowing for efficient memory use and increased training speed with respect to Gaussian splatting.

Reference is now made to FIG. 4. FIG. 4 shows in flowchart form, a method 400 allowing for efficient memory use and increased training speed with respect to Gaussian splatting. The method 400 may be performed in a networked computing environment that supports Gaussian splatting, such as the networked computing environment 100 shown in FIG. 1. In some embodiments, the memory 140, the memory 164, or a combination thereof may store computer-executable instructions for executing the method 400.

The method 400 begins with an operation 402. At operation 402, a processor, such as the processor 120, may determine that a first portion of an object to be modelled by Gaussian splatting has a lower priority. For example, if a painting were to be modelled by Gaussian splatting, the processor 120 may determine that the backside of the painting has a lower priority.

At operation 402, a processor may determine that the first portion has a lower priority based on user input. For example, in the context of generating a Gaussian splat model for a painting sold by a merchant user, the merchant user may submit, from a user device such as the user device 160, data indicating that the backside of the painting has a lower priority. The merchant user may indicate that the backside of the painting has a lower priority by drawing, on an image of the painting, a volume around the backside of the painting. The merchant may draw the volume via a touchscreen. Additionally or alternatively, computer vision-based segmentation may also be used to assist the merchant user in indicating the lower priority of the backside. In another embodiment, the merchant user may send a textual message such as "the backside has lower priority than the front" to the computing system generating the Gaussian splat model such as computing system 110. The processor may determine the lower priority of the first portion, such as the backside, based on the received textual message.

In another embodiment, the processor may determine that the first portion has a lower priority based on an object type associated with the object to be modelled by Gaussian splatting. For example, if the object being modelled is a painting, the processor may obtain data pertaining to the priorities of portions of other paintings. Based on the data pertaining to other paintings, the processor may determine that the backside of the painting has a lower priority relative to the front of the painting.

In another embodiment, the processor may determine that the first portion has a lower priority based on a text description of the object to be modelled by Gaussian splatting. For example, in response to obtaining the text description "beautiful painting of a mount with a cool backside" for an object, the processor may determine that the portion of the object corresponding to the frame of the painting has a lower priority than the portion of the object corresponding to the backside of the painting.

In another embodiment, the processor may determine that the first portion has a lower priority based on stored viewing data for images of one or more objects of the same type as the object. For example, when generating a Gaussian splat model for a painting, the processor may obtain data from memory or storage in the computing device, or alternatively an external database, indicating that on an associated e-commerce platform, shoppers of paintings frequently view fronts of paintings, less frequently view the frames of paintings, and even less frequently view the backsides of paintings. Based on such data, the processor may determine that the backside has a lower priority than other portions of the painting.

Additionally or alternatively, artificial intelligence such as generative artificial intelligence may be used for determining that the first portion of the object has a lower priority. For example, the processor may use artificial intelligence to determine the lower priority based on a text description. In another example, the processor may use artificial intelligence to isolate the first portion with a lower priority based on user input. In another example, the processor may use artificial intelligence to analyze stored viewing data. In another example, the processor may determine that the first portion has a lower priority based on artificial intelligence alone. For example, the processor may use artificial intelligence to analyze an image of a painting provided by a merchant user and determine that the backside of the painting has a lower priority than the front of the painting.

At operation 404, an image capturing device, such as the user device 160, is activated for the purposes of capturing images to train a Gaussian splat model for an object. In some embodiments, a merchant user may activate the image capturing device in response to a prompt received from the computing system for generating the Gaussian splat model, such as computing system 110. In another embodiment, the computing system may use a network connection, such as network 180, to activate the image capturing device.

In operation 406, the image capturing device is moved around the object. In some embodiments, the computing system may send a message to the image capturing device to move via a network. The message may be shown on a display of the image capturing device. In some embodiments, a merchant user may manually move the image capturing device around the object. In another embodiment, a merchant user may control an apparatus, such as a drone, to move the image capturing device around the object. In another embodiment, the computing device may use a network to move the image capturing device around the object. For example, the image capturing device may have a network connection with a moveable apparatus such as a camera rig or a drone. The computing device may use a network to send instructions to the image capturing device to move. The image capturing device may then use its connection to the rig or drone to control the movement of the rig or drone.

Following operation 406, flow control proceeds to a decision 408. At decision 408, it is determined whether the current view of the image capturing devices includes the first portion. In some embodiments, the image capturing device may receive information identifying the first portion from the computing system and determine whether the first portion is included in its current view. In other embodiments, the computing system may use a network connection with the image capturing device to determine whether the first portion is predominant in its view. In the example of generating a Gaussian splat model for a painting, the image capturing device may determine that the backside is predominant in its view. If the first portion is predominant, flow control proceeds to an operation 410, otherwise flow control proceeds to an operation 412.

At operation 410, the image capturing device captures images at a low concentration. More generally, a computing device such as the image capturing device, may determine that a current view predominantly includes the first portion and, responsive thereto, lower a frequency at which the image capturing device captures images while in motion around the object. At operation 412, on the other hand, the image capturing device captures images at a high concentration. That is, a computing device such as the image capturing device, may determine that a current view predominantly includes the first portion and, in response, it may increase the frequency at which the image capturing device captures images while in motion around the object.

As explained when describing the method 300, in this particular context, "less dense" and "lesser concentration" do not mean that there are fewer images including view of the first portion in the plurality of images relative to images including of another portion of the object. A finite number of images of an object or a portion of an object cannot cover all viewpoints of that object or portion of that object; consequently, there are missing viewpoints. "Less dense" and "lesser concentration" may be interpreted to mean that the ratio of missing viewpoints to covered viewpoints is greater. They may also be interpreted to mean that the ratio of covered viewpoints to missing viewpoints is lesser.

Following operation 410, flow control proceeds to a decision 414. Flow control also proceeds to decision 414 following operation 412. At decision 414, it is determined whether the process of capturing images is finished. In some embodiments, the computing system may determine that a sufficient amount of images have been captured to generate a Gaussian splat model. In other embodiments, the image capturing device may have software or programming that allows it to determine that it has completed a lap or circle around the object while keeping its image capturing surface or side, such as the lens-side of a camera of smartphone, directed toward the object. The image capturing device may determine that it has finished capturing images based on data or output received from this software or programming. If it is determined that the process of capturing images is not finished, flow control returns to operation 406. Otherwise, flow control proceeds to an operation 416.

At operation 416, the image capturing device sends the captured images to the computing system. That is, the computing system receives a plurality of images from the image capturing device. In some embodiments, the images may be sent in response to a merchant user initializing the sending of the images. For example, the image capturing device may prompt to the merchant user "Image capture complete. Do you want to send images to 3D model generator?" In response, the merchant user may press a "yes" button on a touchscreen or swipe right on the touchscreen to send the images. In another embodiment, the image capturing device may automatically send the images to the computing device after finishing capturing the images. In some embodiments, the images may be stored in storage, such as an internal storage of the computing device or a database, and used at a later time to generate the Gaussian splat model.

As a result of the method 400, the computing device obtains a plurality of images of the object to be modelled by Gaussian splatting, wherein the plurality of images contains 1) images including views of the first portion of the object from a first concentration of viewpoints, and 2) images including view of another portion of the object from a second concentration of viewpoints wherein the first concentration is less than the second concentration.

During the method 400, the image capturing device may capture a plurality of images before sending them to the computing device. In some other embodiments, the image capturing device may send the images to the computing device as they are captured.

It is noted that in some embodiments, operation 406, decision 408, operation 410, operation 412, and decision 414 may occur simultaneously. That is, the image capturing device may be moved as it is capturing images, at lower or higher concentrations, while it is being determined whether the first portion is predominant in the view of the image capturing device and whether the image capturing process is finished. In some embodiments, the image capturing device may determine that a current view predominantly includes the first portion and, responsive thereto, display instructions on a display screen, such as a touchscreen, to increase movement speed of the image capturing device. The capture of images of the object that predominantly include the first portion occurring at a lesser concentration or frequency allows for the quicker movement of the image capturing device. Likewise, in some embodiments, the image capturing device may determine that a current view does not predominantly include the first portion and, responsive thereto, display instructions on a display screen to decrease the movement speed of the image capturing device. The capture of images of the object that do not predominantly include the first portion occurring at a greater concentration or frequency may benefit from a slower movement of the image capturing device.

It is also noted that the method 400 may be generalized for situations involving multiple priorities. For example, when capturing images of a painting in which the frame has a lower priority than the front and the backside has an even lower priority than the frame, a similar method to the method 400 may be employed. This similar method may allow the image capturing device to capturing images at more than two concentrations or frequencies.

Advantages provided by the method 400 include the lower number of images that are captured to train the Gaussian splat model. The lower number of images results in a more efficient use of memory because less memory is used to store the images during the generation and training of the Gaussian splat model. The lower number of images also results in a quicker training speed for the Gaussian splat model because fewer images are used to calculate loss during the gradient descent algorithm.

Figure 5:
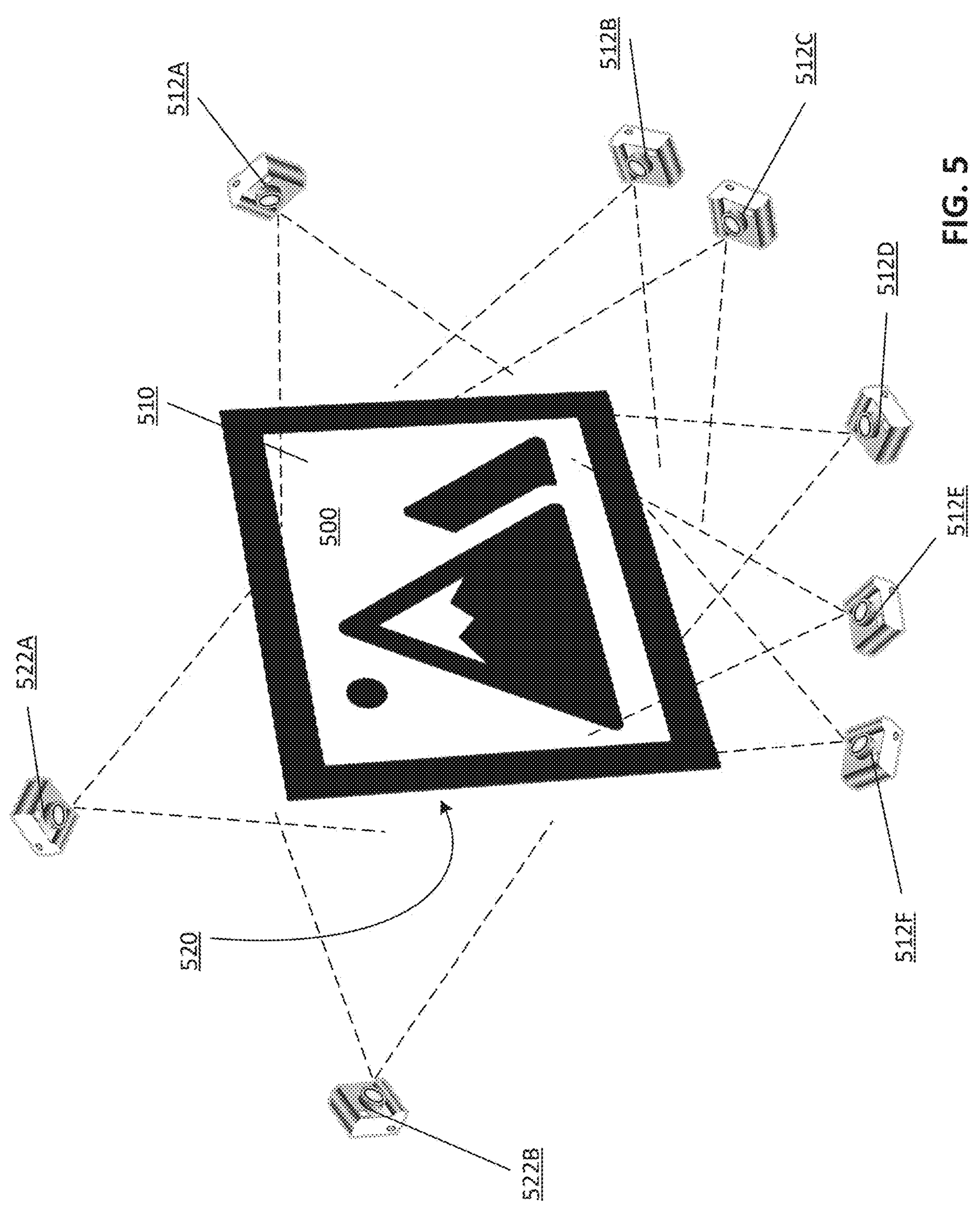
FIG. 5 is a diagram illustrating example viewpoints of a product used to train a Gaussian splat model.

Reference is made to FIG. 5. FIG. 5 is a diagram showing example viewpoints of an object or product used to train a Gaussian splat model.

In the embodiment shown in FIG. 5, the object or product is a painting 500. The painting 500 has a front 510 and a backside 520. FIG. 5 shows viewpoints 512A to 512F from which an image capturing device, such as the user device 160, may capture images of the front 510. FIG. 5 also shows viewpoints 522A and 522B from which that image capturing device may capture images of the backside 520.

FIG. 5 may be illustrative of the viewpoints or images of the painting that would be captured by the image capturing device in the method 400. Specifically, the processor may determine at operation 402 that the backside 520 has a lower priority, the image capturing device may capture images corresponding to the viewpoints 522A and 522B at operation 410, and the image capturing device may capture images corresponding to the viewpoints 512A to 512F at operation 412. Notably, viewpoints of the backside 520 are captured at a lesser concentration or frequency than the viewpoints of the front 510. Further, the plurality of images of the object used to train the Gaussian splat model are from a series of different viewpoints.

FIG. 5 may also be illustrative of the viewpoints or images that would be used to train or generate the Gaussian splat model as a result of the method 300. Specifically, the processor may determine that the backside 520 has a lower priority at operation 302 and may select images corresponding to the viewpoints 512A to 512F as well as 522A and 522B at the operation 306. Further, the plurality of images of the object used to train the Gaussian splat model are from a series of different viewpoints.

As explained when describing the methods 300 and 400, in the context of capturing, selecting, or obtaining images for Gaussian splatting, "less dense" and "lesser concentration" do not mean that there are fewer images including views of the first portion that has a lower priority in the plurality of images relative to images including of another portion of the object. A finite number of images of an object or a portion of an object cannot cover all viewpoints of that object or portion of that object; consequently, there are missing viewpoints. "Less dense" and "lesser concentration" may be interpreted to mean that the ratio of missing viewpoints to covered viewpoints is greater. They may also be interpreted to mean that the ratio of covered viewpoints to missing viewpoints is lesser.

Figure 6:
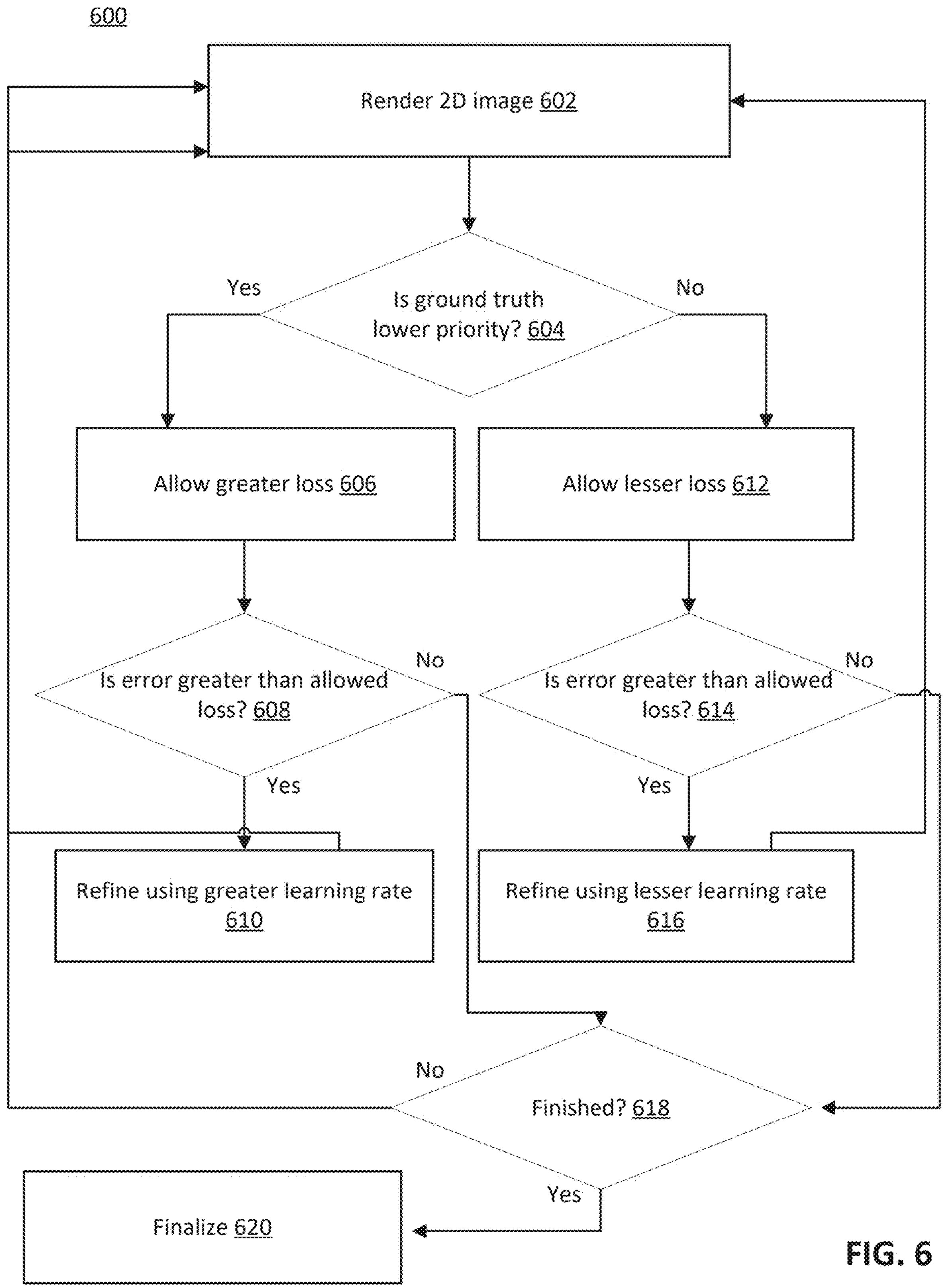
FIG. 6 shows in flowchart form, a simplified example method allowing for increased training speed with respect to Gaussian splatting.

Reference is now made to FIG. 6, which shows, in flowchart form, a method 600 allowing for increased training speed with respect to Gaussian splatting. The method 600 may be performed by a computing system that supports Gaussian splatting, such as the computing system 110 shown in FIG. 1. In particular, the memory 140 may store computer-executable instructions for the processor 120 to execute the operations of the method 600 via the Gaussian splatting engine 130. In some embodiments, the method 600 may be executed as part of the execution of operation 308 in the method 300. Specifically, the processor may perform the method 600 as part of the gradient descent algorithm used to train the Gaussian splat model.

The method 600 begins with operation 602. At operation 602, based on a currently stored, or current state of, the Gaussian splat model, the processor renders, rasterizes, or projects, a 2D image corresponding to a ground truth 2D image used as training data. The ground truth 2D image may be one of the plurality of images selected in operation 306 of the method 300. In another embodiment, the ground truth 2D image may be one of the images sent to the computing system in operation 416 of the method 400.

Following operation 602, flow control proceeds to a decision 604. At decision 604, the processor determines if the ground truth 2D image has a lower priority. In some embodiments, during execution of the gradient descent algorithm, the computing system may store, for example in the memory 140, a priority field in association with the ground truth 2D image. The priority field may indicate the priority of the ground truth 2D image. The processor may access the priority field to determine the priority of the ground truth 2D image. In other embodiments, the processor may determine the priority of the ground truth image similarly to how the processor determines the lower priority of the first portion in operation 302 of the method 300.

If the processor determines that the ground truth 2D image has a lower priority, flow control may proceed to an operation 606. At operation 606, the processor allows greater loss when comparing the rendered 2D image to the ground truth 2D image during the gradient descent algorithm. In other words, the processor may allow for greater error between the rendered 2D image and the ground truth 2D image.

Following operation 606, flow control proceeds to decision 608. At decision 608, the processor determines if the error between the rendered 2D image and the ground truth 2D image is greater than the allowed loss. If the error is greater than the allowed loss, flow control proceeds to operation 610.

At operation 610, the processor, as part of its execution of the gradient descent algorithm, may adjust the parameters of the Gaussian splats of the current state of the Gaussian splat model that contributed to the rendering of the rendered 2D image. More generally, the processor may refine the Gaussian splats defining the Gaussian splat model. When refining a Gaussian splat, such as the Gaussian splat 210, the processor may adjust the position, covariance matrix, opacity, or data channels, such as the position 222, the covariance matrix 224, the opacity 226, and the data channels 228. In other embodiments, the processor may clone or split a Gaussian splat as part of the refining process.

During gradient descent, the amount by which the processor adjusts the parameters, or refines the Gaussian splat model, may be referred to as a learning rate. At operation 610, the processor uses a greater learning rate to refine the Gaussian splats. That is, the parameters of the Gaussian splats are adjusted a greater amount.

Following operation 610, flow control returns to operation 602. During this second execution of operation 602, the processor may render, rasterize, or project a second 2D image corresponding to a second ground truth 2D image used as training data. On the other hand, the processor may render, rasterize, or project a second 2D image corresponding to the same ground truth 2D image used previously. If the processor uses the same ground truth 2D image, the second rendered 2D image will be different from the originally rendered 2D image as a result of the refining of the Gaussian splats that occurred in operation 610.

Returning to decision 608, if the error is not greater than the allowed loss, flow control may proceed to decision 618. At decision 618, the processor may determine whether the training process of the Gaussian splat model has finished. In some embodiments, the training process may be finished when the following conditions are met:

1. Based on the current state of the Gaussian splat model, the processor has rendered a corresponding 2D image for each of the plurality of ground truth images used as training data; and
2. For each pair of rendered corresponding 2D image and ground truth image, the error between the images is less than the allowed loss for that particular ground truth image.

If the processor determines that the training has not finished, flow control may return to operation 602. The execution of the method 600 may continue as described above.

On the other hand, if the processor determines that the training has finished, flow control may proceed to an operation 620. At operation 620, the processor may finalize the Gaussian splat model. Finalizing the Gaussian splat model may entail storing the Gaussian splat model and its Gaussian splats that have been refined via the training process in a storage such as a storage internal to the computing device or an external storage such as the database 150.

The finalized and stored Gaussian splat model may be used to load, render, rasterize, or project images of the modelled object to the website of an e-commerce platform. For example, a shopper of paintings browsing on an e-commerce platform may click on a thumbnail of a painting modelled using Gaussian splatting. In response, the e-commerce platform may, based on the finalized Gaussian splat model, load an image of the selected painting onto the display screen of the shopper's device. In particular, the loaded image may be interactive. For example, the shopper may, using a cursor, click and drag the loaded image to manipulate the loaded image and view the painting from different angles. The finalized Gaussian splat model may load views of the selected painting in real-time as the shopper manipulates the image.

Returning to decision 604, if the ground truth image is not of a lower priority, flow control may proceed to operation 612. Operation 612 is similar to operation 606. However, unlike operation 606, operation 612 allows lower loss. That is, the processor may allow for less error between the rendered 2D image and the ground truth 2D image.

Following operation 612, flow control proceeds to a decision 614. Similar to decision 608, at decision 614, the processor determines if the error between the rendered 2D image and the ground truth 2D image is greater than the allowed loss. If the error is not greater than the allowed loss, flow control proceeds to decision 618. Otherwise, flow control proceeds to operation 616.

Similar to operation 610, at operation 616, the processor, as part of its execution of the gradient descent algorithm, may adjust the parameters of the Gaussian splats of the current state of the Gaussian splat model that contributed to the rendering of the rendered 2D image. More generally, the processor may refine the Gaussian splats defining the Gaussian splat model. When refining a Gaussian splat, such as the Gaussian splat 210, the processor may adjust the position, covariance matrix, opacity, or data channels, such as the position 222, the covariance matrix 224, the opacity 226, and the data channels 228. In other embodiments, the processor may clone or split a Gaussian splat as part of the refining process. Unlike operation 610, at operation 616, the processor may use a greater learning rate to refine the Gaussian splats.

In the method 600 illustrated in FIG. 6, the processor refined the Gaussian splats defining the Gaussian splat model differently according to priority of the grand truth 2D image. Specifically, the processor may execute a training algorithm that uses a dynamic loss that may be greater for images from the plurality of images that include views of the first portion relative to images from the plurality of images that include views of another portion. Further, the processor may execute a training algorithm that uses a dynamic learning rate that may be greater for images from the plurality of images that include views of the first portion relative to images from the plurality of images that include view of another portion. In other embodiments, the processor may execute a training algorithm that uses the dynamic loss but not the dynamic learning rate. In another embodiment, the processor may execute a training algorithm that uses the dynamic learning rate but not the dynamic loss.

Advantages provided by the method 600 include a faster training speed for the Gaussian splat model. The allowance for greater loss (dynamic loss) and the usage of a greater learning rate (dynamic learning rate) may result in the training finishing faster as the training algorithm does not need to execute the iterations of a gradient descent algorithm required for a more accurate Gaussian splat model. The adjustments of the allowed loss or learning rate according to priority allows the Gaussian splat model to maintain a higher level of accuracy or precision in important or high-interest portion or areas of the object modelled by Gaussian splatting.

The methods 300, 400, and 600 were described referring to a "lower priority." It is noted that the methods and embodiments described herein are not limited to a lower priority and a non-lower priority. The methods and embodiments described herein may use a gradation of priorities. Specifically, the gradation of priorities may allow a processor, such as the processor 120, to use varying levels of concentrations or frequencies of images to train the Gaussian splat model. Likewise, the processer may use more than two values for the allowed loss or the learning rate during the training process of the Gaussian splat model. The gradation of priorities allows the computing system to customize accuracy of precision of the Gaussian splat model according to the importance or level of interest of portions or areas of the object being modelled by Gaussian splatting.

Figure 7:
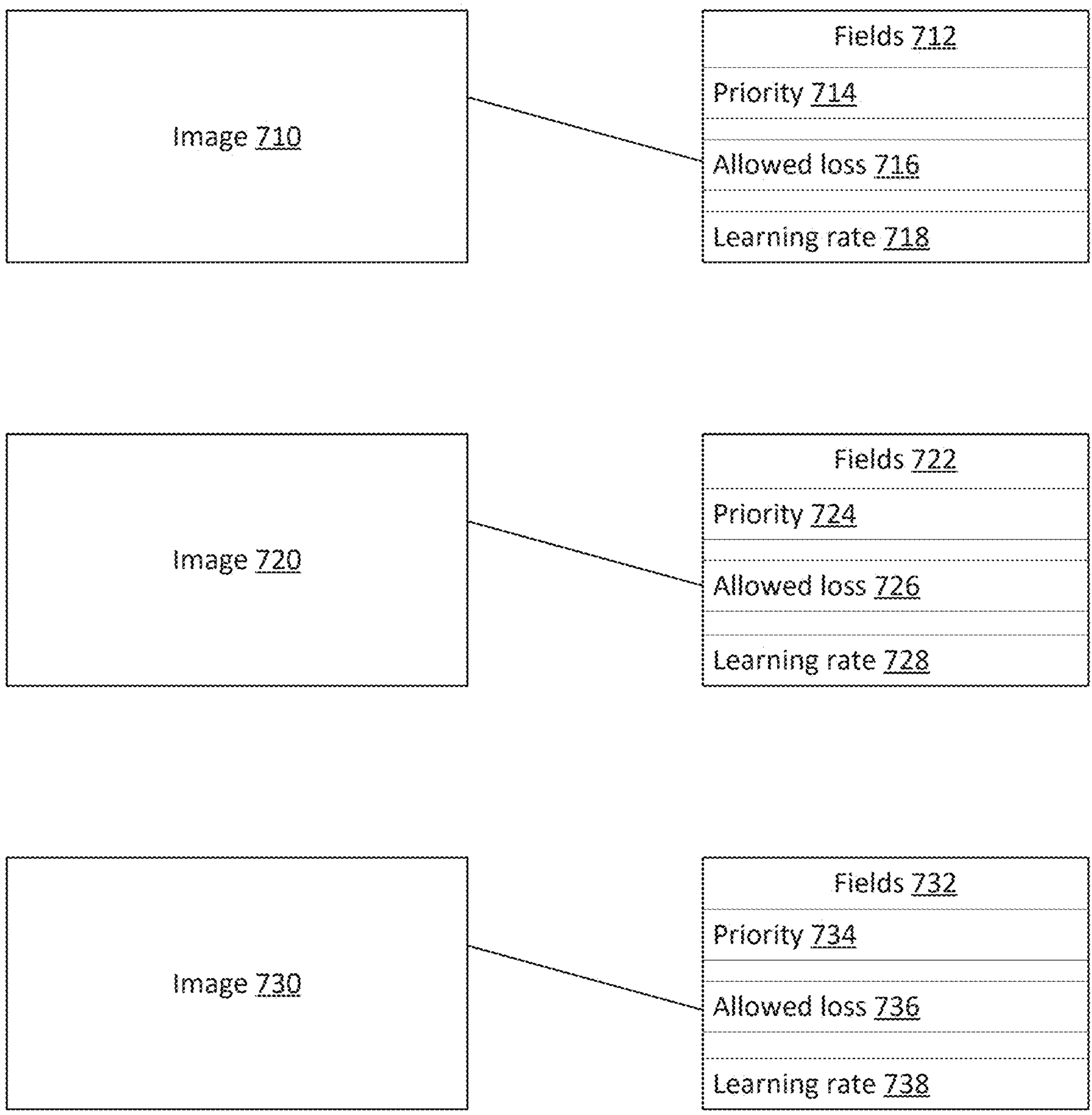
FIG. 7 is a diagram illustrating ground truth image-specific fields for increasing training speed with respect to Gaussian splatting.

Reference is now made to FIG. 7. FIG. 7 is a diagram illustrating ground truth image-specific fields for increasing training speed with respect to Gaussian splatting. In some embodiments, the processor may associate fields with the ground truth images during the training of the Gaussian splat model.

FIG. 7 shows images 710, 720, and 730 which may each be a ground truth image of the object being modelled by Gaussian splatting. Each of the images 710, 720, and 730 are associated with fields 712, 722, and 732 respectively. The fields 712 include a priority 714, an allowed loss 716, and a learning rate 718. The fields 722 include a priority 724, an allowed loss 726, and a learning rate 728. Likewise, the fields 732 includes a priority 734, an allowed loss 736, and a learning rate 738.

The priorities 714, 724, and 734 may be different values from one another. For example, the priority 714 may be "low," the priority 724 may be "moderate," and the priority 734 may be "moderately low."

Likewise, the allowed losses 716, 726, and 736 may be different from one another. Further, the learning rates 718, 728, and 738 may be different from one another.

In some embodiments, during the training process using a gradient descent algorithm, a processor, such as the processor 120, may refer to the associated field. For example, during execution of the method 600, the processor may render a 2D image corresponding to the image 710 at operation 602. At the decision 604, the processor may refer to priority 714 to determine the priority of image 710. Likewise, the processor may use the allowed loss 716 at decision 608 (assuming that the image 710 has a lower priority). Likewise, the processor may use the learning rate 718 at operation 610.

Although the present disclosure describes methods and processes with operations using phrases such as "greater," "less," and "lesser," these phrases may be replaced with other comparator phrases such as "greater than or equal to" or "less than or equal to" where appropriate.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:

determining that a first portion of an object has a lower priority than another portion of the object, wherein a priority represents a level of interest in a portion of the object;

obtaining a plurality of images of the object, wherein obtaining includes, based on the first portion of the object having lower priority than the another portion of the object:

obtaining images including views of the first portion of the object from a first concentration of viewpoints; and obtaining images including views of the another portion of the object from a second concentration of viewpoints, the first concentration being less than the second concentration; and training a three-dimensional model of the object using a training algorithm that processes the plurality of images as training data to generate and refine Gaussian splats defining the three-dimensional model.

2. The computer-implemented method of claim 1, wherein the lower priority of the first portion is determined based on user input.

3. The computer-implemented method of claim 1, wherein the lower priority of the first portion is determined based on an object type associated with the object.

4. The computer-implemented method of claim 1, wherein the lower priority of the first portion is determined based on stored viewing data for images of one or more objects of a same type as the object.

5. The computer-implemented method of claim 1, wherein obtaining the plurality of images of the object includes:

receiving an initial plurality of images of the object from an image capturing device; and generating a subset of the initial plurality of images, the subset including fewer images of the object that include views of the first portion than the initial plurality of images.

6. The computer-implemented method of claim 1, wherein the plurality of images of the object are from a series of different viewpoints.

7. The computer-implemented method of claim 6, wherein obtaining the plurality of images of the object includes receiving the plurality of images from an image capturing device.

8. The computer-implemented method of claim 7, further comprising:

determining, by the image capturing device, that a current view predominantly includes the first portion and, responsive thereto, lowering a frequency at which the image capturing device captures images while in motion around the object.

9. The computer-implemented method of claim 7, further comprising:

determining, by the image capturing device, that a current view predominantly includes the first portion and, responsive thereto, displaying instructions on a display screen to increase movement speed of the image capturing device.

10. The computer-implemented method of claim 1, wherein the training includes:

determining that one of the Gaussian splats is associated with the first portion of the object and, in response, reducing an amount of data stored in data channels associated with the one of the Gaussian splats.

11. The computer-implemented method of claim 1, wherein the training includes:

determining that one of the Gaussian splats represents a low-data portion of the object and, in response, reducing an amount of data stored in data channels associated with the one of the Gaussian splats.

12. The computer-implemented method of claim 1, wherein the training algorithm uses a dynamic loss that is greater for images from the plurality of images that include views of the first portion relative to images from the plurality of images that include views of the another portion.

13. The computer-implemented method of claim 1, wherein the training algorithm uses a dynamic learning rate that is greater for images from the plurality of images that include views of the first portion relative to images from the plurality of images that include views of the another portion.

14. A computing system comprising:

a processor; and a memory coupled to the processor, the memory storing computer-executable instructions that, when executed by the processor, are to cause the processor to:

determine that a first portion of an object has a lower priority than another portion of the object, wherein a priority represents a level of interest in a portion of the object;

obtain a plurality of images of the object, wherein obtaining includes, based on the first portion of the object having lower priority than the another portion of the object:

obtaining images including views of the first portion of the object from a first concentration of viewpoints; and obtaining images including views of the another portion of the object from a second concentration of viewpoints, the first concentration being less than the second concentration; and train a three-dimensional model of the object using a training algorithm that processes the plurality of images as training data to generate and refine Gaussian splats defining the three-dimensional model.

15. The computing system of claim 14, wherein obtaining the plurality of images of the object includes:

receiving an initial plurality of images of the object from an image capturing device; and generating a subset of the initial plurality of images, the subset including fewer images of the object that include views of the first portion than the initial plurality of images.

16. The computing system of claim 14, wherein the plurality of images of the object are from a series of different viewpoints.

17. The computing system of claim 14, wherein obtaining the plurality of images of the object includes receiving the plurality of images from an image capturing device.

18. The computing system of claim 17, further comprising:

determining, by the image capturing device, that a current view predominantly includes the first portion and, responsive thereto, lowering a frequency at which the image capturing device captures images while in motion around the object.

19. The computing system of claim 14, wherein the training algorithm uses a dynamic loss that is greater for images from the plurality of images that include views of the first portion relative to images from the plurality of images that include views of the another portion.

20. A non-transitory, computer-readable storage medium storing computer-executable instructions that, when executed by one or more processors, are to cause the one or more processors to:

determine that a first portion of an object has a lower priority than another portion of the object, wherein a priority represents a level of interest in a portion of the object;

obtain a plurality of images of the object, wherein obtaining includes, based on the first portion of the object having lower priority than the another portion of the object:

obtaining images including views of the first portion of the object from a first concentration of viewpoints; and obtaining images including views of the another portion of the object from a second concentration of viewpoints, the first concentration being less than the second concentration; and train a three-dimensional model of the object using a training algorithm that processes the plurality of images as training data to generate and refine Gaussian splats defining the three-dimensional model.

* * * * *